United States Patent
Hoiss

(10) Patent No.: US 9,409,601 B2
(45) Date of Patent: Aug. 9, 2016

(54) MOTOR VEHICLE HAVING AN AXLE SUPPORT

(71) Applicant: Bayerische Motoren Werke Aktiengesellschaft, Munich (DE)

(72) Inventor: Franz Hoiss, Bernried (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 14/737,881

(22) Filed: Jun. 12, 2015

(65) Prior Publication Data
US 2015/0274210 A1   Oct. 1, 2015

Related U.S. Application Data

(63) Continuation of application No. PCT/EP2013/075953, filed on Dec. 9, 2013.

(30) Foreign Application Priority Data

Dec. 14, 2012   (DE) .......................... 10 2012 223 292

(51) Int. Cl.
| | |
|---|---|
| B62D 21/11 | (2006.01) |
| B62D 21/15 | (2006.01) |
| B62D 25/08 | (2006.01) |
| B60K 5/12 | (2006.01) |

(52) U.S. Cl.
CPC .............. B62D 21/155 (2013.01); B60K 5/12 (2013.01); B62D 25/085 (2013.01)

(58) Field of Classification Search
CPC .... B62D 21/11; B62D 21/155; B62D 25/085; B60K 5/12
See application file for complete search history.

(56) References Cited

U.S. PATENT DOCUMENTS

| | | | |
|---|---|---|---|
| 5,605,353 A * | 2/1997 | Moss ..................... | B62D 21/09 188/376 |
| 5,740,876 A * | 4/1998 | Shimose .............. | B60K 5/1216 180/232 |
| 5,884,963 A | 3/1999 | Esposito et al. | |

(Continued)

FOREIGN PATENT DOCUMENTS

| | | |
|---|---|---|
| AT | 005 453 U1 | 7/2002 |
| CA | 2 236 816 C | 8/2002 |

(Continued)

OTHER PUBLICATIONS

International Search Report (PCT/ISA/210) dated Feb. 27, 2014, with English Translation (four (4) pages).

(Continued)

*Primary Examiner* — Laura Freedman
(74) *Attorney, Agent, or Firm* — Crowell & Moring LLP

(57) ABSTRACT

A rear region of an axle support is connected to at least one supporting body component in the front, lower region of the passenger compartment of the vehicle body by way of at least one support extending rearward. The support is connected to the supporting body component by a pyrotechnically releasable connecting element. A guide is arranged between the rear end region of the support and the supporting body component, which guide permits only an displacement of the guided end region of the support rearward as viewed in the direction of travel if the connection is released by the pyrotechnic connecting element between the support and the supporting body component.

13 Claims, 2 Drawing Sheets

(56) References Cited

U.S. PATENT DOCUMENTS

| | | | | |
|---|---|---|---|---|
| 6,146,071 | A * | 11/2000 | Norkus | F16B 37/044 |
| | | | | 296/187.09 |
| 6,367,869 | B1 * | 4/2002 | Baccouche | B62D 21/155 |
| | | | | 280/784 |
| 8,267,429 | B2 * | 9/2012 | Takeshita | B62D 21/155 |
| | | | | 280/784 |
| 8,333,425 | B2 * | 12/2012 | Yoshida | B62D 21/152 |
| | | | | 296/187.09 |
| 8,480,102 | B2 * | 7/2013 | Yamada | B62D 21/155 |
| | | | | 180/311 |
| 8,532,881 | B2 * | 9/2013 | Ostling | F16B 31/005 |
| | | | | 180/271 |
| 8,550,543 | B2 * | 10/2013 | Yoshida | B62D 21/155 |
| | | | | 280/784 |
| 9,150,252 | B2 * | 10/2015 | Yasui | B62D 21/11 |
| 9,150,253 | B2 * | 10/2015 | Watanabe | B62D 21/11 |
| 9,260,136 | B2 * | 2/2016 | Miyagano | B62D 21/155 |
| 2001/0054521 | A1 | 12/2001 | Hawener et al. | |
| 2004/0182628 | A1 | 9/2004 | Winkler | |
| 2012/0049571 | A1 | 3/2012 | Katou et al. | |

FOREIGN PATENT DOCUMENTS

| | | |
|---|---|---|
| DE | 195 32 746 A1 | 3/1997 |
| DE | 196 36 167 C1 | 1/1998 |
| DE | 199 11 663 A1 | 9/2000 |
| DE | 100 31 165 C2 | 4/2002 |
| DE | 102 31 809 A1 | 2/2004 |
| DE | 699 19 140 T2 | 8/2005 |
| DE | 10 2004 031 086 A1 | 1/2006 |
| DE | 10 2008 015 182 A1 | 9/2009 |
| DE | 10 2010 018 689 A1 | 11/2011 |
| DE | 10 2010 018 691 A1 | 11/2011 |
| EP | 1 036 689 A2 | 9/2000 |
| EP | 1 935 696 A1 | 6/2008 |

OTHER PUBLICATIONS

German Search Report dated Jun. 4, 2013, with partial English translation (ten (10) pages).

* cited by examiner (State of the Art)

MOTOR VEHICLE HAVING AN AXLE SUPPORT

CROSS REFERENCE TO RELATED APPLICATIONS

This application is a continuation of PCT International Application No. PCT/EP2013/075953, filed Dec. 9, 2013, which claims priority under 35 U.S.C. §119 from German Patent Application No. 10 2012 223 292.3, filed Dec. 14, 2012, the entire disclosures of which are herein expressly incorporated by reference.

BACKGROUND AND SUMMARY OF THE INVENTION

The invention relates to a motor vehicle having an axle support arranged between a drive unit and a vehicle occupant compartment.

An axle support, frequently also called a subframe or an auxiliary frame, is a component of many passenger cars having a self-supporting vehicle body. The vehicle-body-side linkage points of the wheel suspensions are fastened to the axle support. Also fastened to the front end subframe are usually the engine, the transmission, the steering gear and, in the case of vehicles with driven front wheels, the differential. The axle support may be rigidly screwed (integral support) to the vehicle body or may be connected to the body by way of rubber bearings. In the case of modern motor vehicles, the axle support frequently has the basic shape of an internally open rectangle or trapezoid.

From European Patent document EP 1 036 689 A2, an axle support of a passenger car is known which, viewed in the direction of travel, is arranged slightly behind a drive unit. The lower ends of two struts are linked to the axle support at its region situated in the front in the direction of travel, which struts are mounted with their upper end regions on engine side members of the body of the passenger car. By way of two rearward-extending supports, the region of the axle support that is in the rear in the direction of travel is connected with supporting vehicle body components in the forward lower region of the vehicle occupant compartment of the vehicle body. The linkages of the struts to the engine side members and to the linkages of the supports to the supporting vehicle body components in the forward lower region of the vehicle occupant compartment can, in each case, be abruptly released by an explosive charge when a frontal impact of the motor vehicle is detected. As a result, the displacement path of the drive unit becomes free toward the rear in the direction of travel. The entire space between the vehicle occupant compartment and the drive unit can be utilized for a displacement. The elements that deform in the event of an accident, such as the engine side members, can thus deform unhindered by the axle support, whereby a large amount of impact energy can be absorbed.

It is an object of the invention to further develop the known motor vehicle having an axle support.

This and other objects are achieved by a motor vehicle according to the invention, having a front end which is arranged in front of a vehicle occupant compartment. A drive unit, for example, an internal-combustion engine, is arranged in the front end. An axle support, on which the vehicle-body-side linkage points of the wheel suspensions of the front wheels are mounted, is situated between the drive unit and the vehicle occupant compartment. The rearward region of the axle support is connected by way of at least one rearward-extending support with a supporting vehicle body part in the forward lower region of the vehicle occupant compartment of the vehicle body. For this purpose, the support is connected with the supporting vehicle body component by a pyrotechnically releasable connecting element. In addition, a guide is arranged between the rearward end region of the support and the vehicle body element, which guide exclusively permits a rearward displacement of the guided end region of the support, as viewed in the direction of travel, if the connection is released by the pyrotechnical connecting element between the support and the vehicle body element. Such a pyrotechnically releasable connecting element may, for example, be a pyrotechnical separating screw, a pyrotechnical separating bolt or a pyrotechnical detent. For the purpose of this invention, all pyrotechnical connecting elements have in common that they contain a pyrotechnical explosive charge. When this pyrotechnical explosive charge is ignited, the connecting element will be damaged so severely or even be destroyed that the connection previously established by it is released. In the case of the use according to the invention, the pyrotechnically releasable connecting element can form a form-locking connection between the support and the vehicle body element, as long as it was not triggered. After the triggering, the pyrotechnical connecting element is destroyed to such an extent that this form-locking will no longer exist or will only exist to such a reduced degree that even low forces will be sufficient for completely releasing the connection.

Such a pyrotechnical separating screw is known, for example, from German Patent document DE 195 32 746 A1. Such a separating screw makes it possible to ensure a stable screwed connection which can be abruptly released by the triggering of a pyrotechnical separating charge. In the event of a detected collision of the vehicle, the pyrotechnical separating screw is preferably triggered with a considerable frontal component, so that this connection is released. For this purpose, the separating screw may be coupled with an air bag control device, so that the separating screw is triggered, for example, simultaneously with the driver's or front passenger's airbag.

Advantageously, the pyrotechnical connecting element can be electrically triggered, the electric line being guided to the pyrotechnically triggerable connecting element from the interior of the vehicle occupant compartment. As a result of the guiding of the electric line through the interior, the line is situated in dry space and is protected from external damage.

In the event of a detected collision, the pyrotechnically releasable connecting element is preferably triggered with a considerable frontal component, so that the connection between the support and the vehicle body element formed by the pyrotechnical connecting element before the triggering will be released.

The arrangement according to the invention permits a robust, simply designable linkage of the axle support to the body of the motor vehicle. When a crash of the motor vehicle with a considerable frontal component is detected, the pyrotechnical connecting element connection, by which the at least one support is linked to the vehicle body component, is abruptly separated, for example, by the air bag control device. As a result, the support is now only connected with the vehicle body component by way of the guide. When the drive unit is now displaced in the rearward direction as a result of the crash, the drive unit strikes against the axle support, so that, viewed in the direction of travel, very high forces act upon the axle support and thereby also on the linkage of the at least one support at the vehicle body component. The support thereby shifts toward the rear. This displacement takes place in a controlled manner, guided by the guide. Defined by the guide, the axle support can thereby escape toward the rear, so that more space is available in the front end, in order to absorb crash energy by targeted deformation. Nevertheless, the axle support is not completely separated from the motor vehicle, so that thereby no additional danger will arise.

The rearward end region of the support and the vehicle body element advantageously mutually overlap in the direction of travel, whereby the rearward end region of the support rests against the underside of the vehicle body element. In a particularly advantageous further development, the guide between the rearward end region of the support and the vehicle body element can be formed by an oblong hole in the support or in the vehicle body component extending in the direction of travel. A guiding element projects through the oblong hole at the—viewed in the direction of travel—rearward end, which guide element is connected with the vehicle body component or with the support. Care should be taken in this case that, also in the event of high acting forces, the guiding element will always project through the oblong hole, so that guidance is ensured. The length of the oblong hole thereby limits the maximal displacement path of the rearward end region of the support and, thereby, of the axle support relative to the vehicle body element toward the rear. The guiding element may, for example, be formed by a screw, which is screwed into the vehicle body component or into the support, and thereby presses the support onto the vehicle body component. As a result, the head of the screw rests against the lateral regions adjoining the oblong hole. The forces acting upon the guide in the case of a crash are so high that the holding force is overcome by which the screw presses the support onto the vehicle body component. After the overcoming of the holding force, the screw only still causes a frictional force between the support and the vehicle body element which, however, is clearly lower than the holding force. In addition, the frictional force contributes to the desired energy absorption. Should this frictional force not be desired, so that, in the event of a crash, the axle support can shift to the rear in a manner that is even more unhindered, the thickness of the component with the oblong hole, in the region of the oblong hole, can decrease in the longitudinal direction of the oblong hole toward the front, viewed in the direction of travel. As a result, the screw will lose its tension force already after a slight displacement in the oblong hole, so that it can also no longer generate any frictional force.

Preferably, the—viewed in the direction of travel—forward region of the axle support is connected by way of struts with the engine side members extending above the axle support, which—viewed on the direction of travel—extend from a front wall of the vehicle passenger compartment toward the front and are used, among other things, for accommodating a front bumper. These struts increase the stiffness of the linkage of the axle support to the rest of the vehicle body. In the event of a crash, they do not represent any significant resistance when the axle support is displaced toward the rear. They buckle primarily in the region of their linkage points to the engine side members and/or to the axle support.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
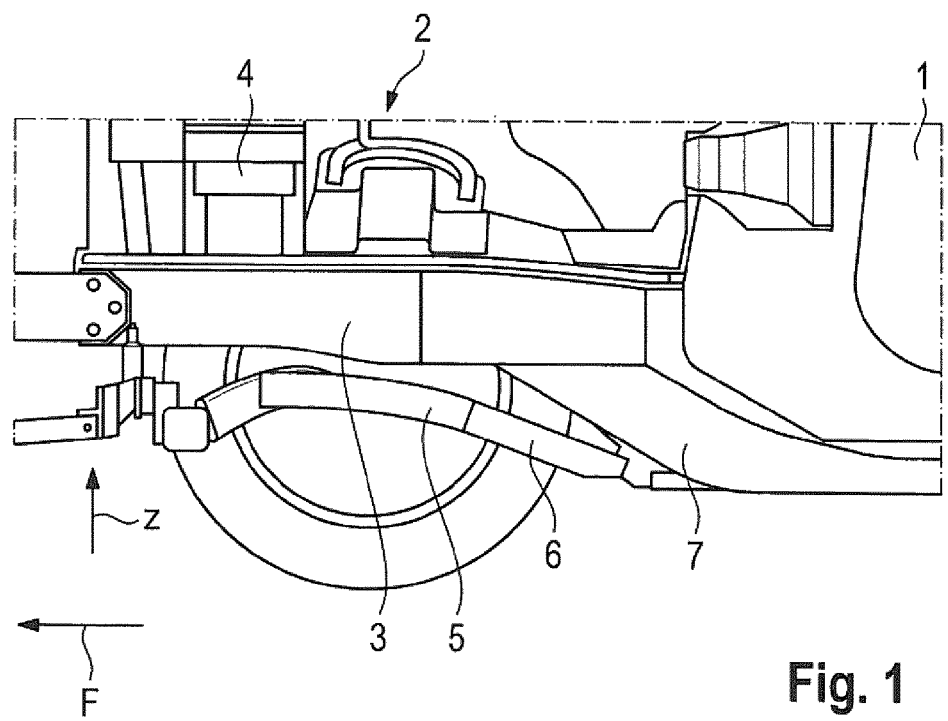
FIG. 1 is a lateral view of a body of a passenger car having an axle support.

FIG. 1 is a lateral view of a passenger car known from prior art. It shows the forward region of a vehicle occupant compartment 1 which, viewed in the direction F of travel, is adjoined in the front by a front end 2. In the front end 2, two mutually parallel-extending engine side members 3 extend from the vehicle occupant compartment 1 toward the front. The two engine side members 3 are used, among other things, for accommodating an internal-combust engine 4 and a front bumper. An axle support 5 is arranged below the engine side members 3, viewed in the direction F of travel, slightly behind the internal-combustion engine 4. The axle support 5 is used for accommodating the wheel suspensions of the front wheels. It has the basic shape of an internally open trapezoid. In the forward region—viewed in the direction F of travel—, the axle support 5 is linked on both sides by way of one strut respectively to the engine side members 3. In the rearward region, the axle support 5 is connected on both sides by way of one support 6 respectively with a supporting vehicle body component 7 in the forward lower region of the vehicle occupant compartment. In this manner, the axle carrier 5 is connected in a simple and robust manner with the body of the motor vehicle.

Figure 2:
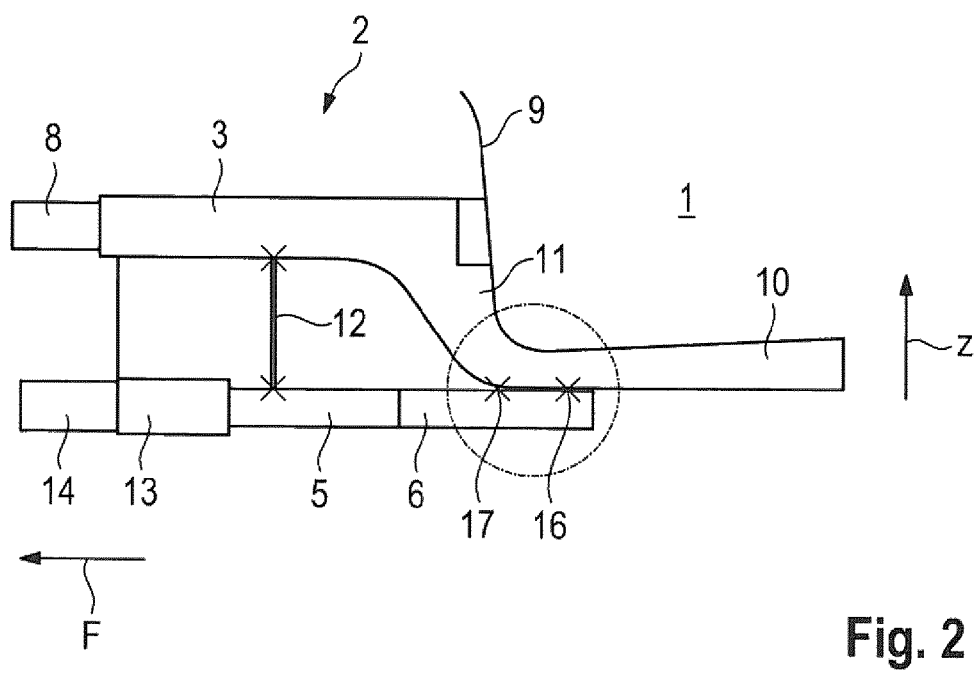
FIG. 2 is a schematic outline of the linkage according to an embodiment of the invention of a linkage of an axle support to a body of a motor vehicle.

Compared to the arrangement of an axle support 5 from the prior art illustrated in FIG. 1, FIG. 2 illustrates an arrangement of an axle support according to an embodiment of the invention by way of a schematic diagram. In this case, the same reference numbers as in FIG. 1 are used for mutually corresponding components. A lateral view of the motor vehicle illustrates an engine side member 3 to whose—viewed in the direction F of travel—forward end section a bumper cross member 8 is linked. At the rear, the engine side member 3 ends at a front wall 9, which wall 9 separates the front end 2 from the vehicle occupant compartment 1 behind it. At the bottom, two mutually parallel-extending floor side members 10 extend along the vehicle occupant compartment 1, viewed in the direction F of travel, which floor side members 10 are in each case connected with an engine side member 3 by way of a connection support 11 extending from the top front diagonally to the bottom rear. The axle support 5 is arranged slightly behind an internal-combustion engine disposed in the front end 2, and is arranged below the engine side members 3. Viewed in the direction F of travel, the axle support 5 is linked in the forward region on both sides by way of one strut 12 respectively to the engine side members 3. As an extension of the two sides of the axle support 5, two mutually parallel supporting members 13 extend toward the front, viewed in the direction F of travel. A cross member 14 is mounted at the two forward end regions of these two supporting members 13, which cross member 14 extends in the transverse direction of the vehicle and forms a lower load path of a bumper module. Toward the rear in the direction F of travel, the axle support 5 is supported by way of two supports 6 on the two floor side members 10. In this case, one support 6 respectively extends from the rearward end region of one side of the axle support 5 to the floor side member 10 on the same side.

Figure 3:
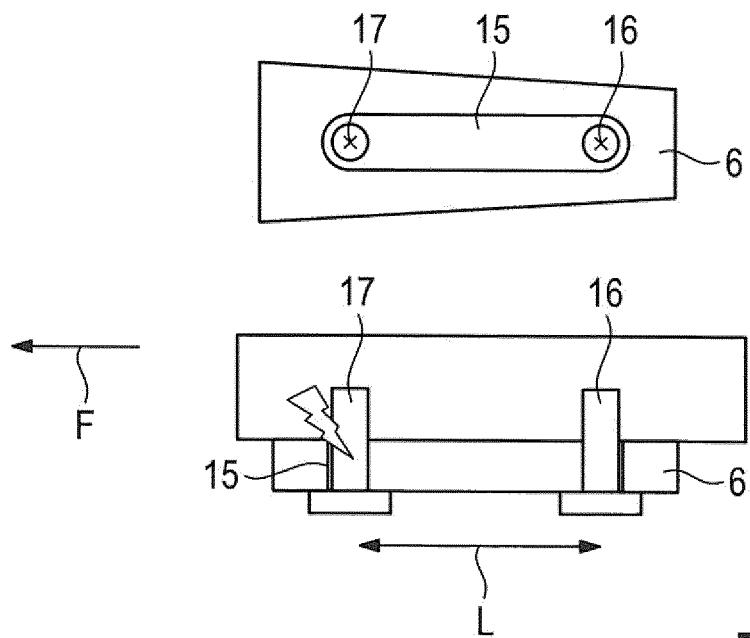
FIG. 3 is a view of a detail of the linkage of the axle support illustrated in FIG. 2 to the forward lower region of the vehicle occupant compartment.

In the vertical direction z of the vehicle, the two supports 6 are in each case screwed to the respective floor side member 10. These screwed connections are illustrated in greater detail in FIG. 3. For this purpose, the support 6 has an oblong hole 15 in the region of the screwed connection, which oblong hole 15 extends in the direction F of travel. A conventional screw 16 projects through the—viewed in the direction F of travel— rearward end section of the oblong hole 15 in the vertical direction z of the vehicle from below through the oblong hole 15, which screw 16 is fixedly screwed into the floor side member 10. In this case, viewed in the vertical direction z of the vehicle, the head of the conventional screw 16 rests from below against the support 6 and thereby presses the latter against the floor side member 10. A pyrotechnical separating screw 17 projects through the—viewed in the direction F of travel—forward end section of the oblong hole 15 also in the vertical direction z of the vehicle from below through the oblong hole 15, which pyrotechnical separating screw 17 is fixedly screwed into the floor side member 10. In this case, viewed in the vertical direction z of the vehicle, the head of the pyrotechnical separating screw 17 rests from below against the support 6 and thereby presses the latter against the floor side member 10. The conventional screw 16 and the pyrotechnical separating screw 17 thereby ensure a stiff linkage of the support 6 to the floor side member 10.

By way of an electric cable, the pyrotechnical separating screw 17 is connected with an airbag control device. When a collision of the motor vehicle with a considerable front component is detected by way of sensors, the airbag control device will release the driver's or front passenger's airbag. Simultaneously, the pyrotechnical separating screw 17 is triggered. The latter contains in its screw shank a pyrotechnical explosive charge which explodes when triggered, so that the screwed connection of the pyrotechnical separating screw 17 will be released. As a result, the support 6 is now held at the floor side member 10 by the conventional screw 16. When high forces now act against the direction F of travel upon the axle support 5 as a result of the deformation of the front end 2 in the event of a crash, the forces acting from the axle support 5 by way of the support 6 upon the connection between the support 6 and the floor side member 10 may be higher than the conventional screw 16 holding force between the support 6 and the floor side member 10. In this case, the support 6 will shift toward the rear despite the screwed connection of the conventional screw 16. Here, the conventional screw 16 will slide along the oblong hole from its rearward position in the oblong hole 15 toward the front. The maximal path by which the support 6 can shift toward the rear is limited by the length L of the oblong hole 15, because then the conventional screw 16 will have reached the frontmost position in the oblong hole 15 and thereby represents a form-locking obstacle.

The connection of the support 6 with the floor side member 10 by way of a conventional screw 16 and a pyrotechnical separating screw 17 therefore ensures a displacement of the axle support 5 toward the rear, so that, in the event of a crash with a considerable front component, this axle support 5 will not significantly hinder the deformation of the front end 2. On the other hand, the connection between the support 6 and the floor side member 10 will also not be released completely. As a result, the support and, therefore, the axle support 5 can shift toward the rear only in a controlled and defined manner, so that no new danger potential arises here.

Figure 4:
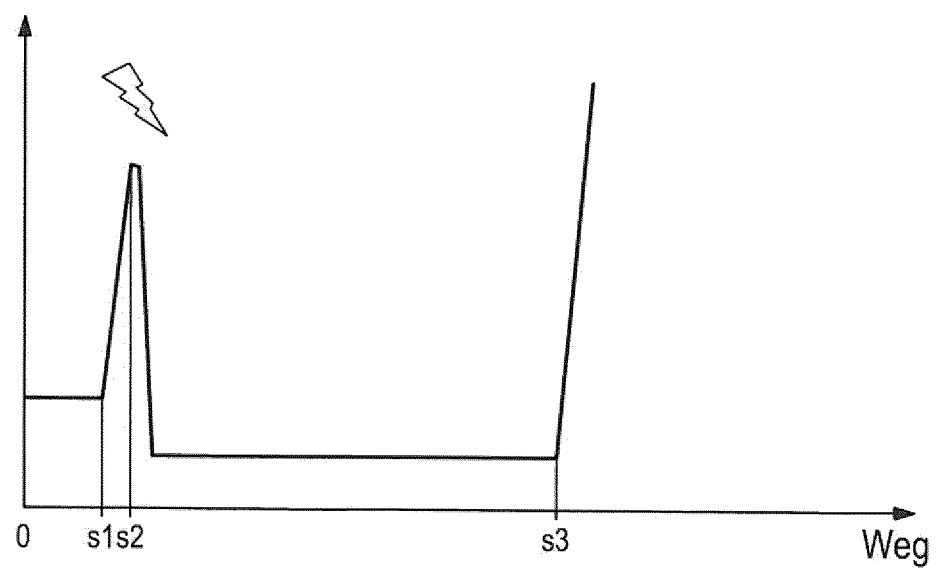
FIG. 4 is a view of a diagram, which illustrates the load level acting upon the axle support by way of a displacement path in the event of a crash.

For illustrating the method of operation, FIG. 4 shows the load level acting upon the connection between the support 6 and the floor side member 10 over the displacement path.

At the beginning of the displacement of the axle support 5 and therefore of the support 6 with respect to the floor side member 10 in the event of a crash, the load level corresponds to the frictional force between the support 6 and the floor side member 10 as a result of the prestressing of the conventional screw 16 and the pyrotechnical separating screw 17. However, even after a minimal path s1, the pyrotechnical separating screw 17 will form-lockingly strike against the forward end of the oblong hole 15, so that at first no further displacement will be possible. In this case, the minimal displacement path s1 essentially corresponds to the mounting tolerance when the pyrotechnical separating screw 17 is screwed in, which, although it is arranged in the forward end region of the oblong hole 15, normally does not rest directly on the frontmost end of the oblong hole. Following the displacement path s1, the load level will increase abruptly because a further displacement becomes possible only with massive deformations. However, in the meantime, the collision was also detected by way of the sensors of the motor vehicle, and the airbag control device triggers the pyrotechnical separating screw 17 following the preceding displacement path s2. As a result, the pyrotechnical separating screw 17 is released, and the load level falls abruptly. The connection is therefore only still maintained by the conventional screw 16, which generates a frictional force between the support 6 and the floor side member 10. However, as a result of this frictional force, the load level will be lower than the initial load level because of the frictional force which the conventional screw had generated together with the pyrotechnical separating screw 17. This low load level will now remain approximately constant over the further displacement path until, following a displacement path s3, the conventional screw 16 will form-lockingly rest against the forward end of the oblong hole 15, so that, starting from the displacement path s3, the load level will now abruptly increase again.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A motor vehicle having a vehicle occupant compartment and a front end arranged in front of the vehicle occupant compartment, a drive unit being arranged in the front end, the motor vehicle comprising:
   an axle support arranged between the drive unit and the vehicle occupant compartment, on which axle support vehicle-body-side linkage points of wheel suspensions of front wheels are mounted;
   a rearward-extending support configured to connect a rearward region of the axle support with a supporting vehicle body part in a forward lower region of the vehicle occupant compartment;
   a pyrotechnically releasable connecting element that connects the rearward-extending support with the supporting vehicle body part; and
   a guide arranged between a rearward end region of the rearward-extending support and the supporting vehicle body part, said guide being configured to permit only a displacement of the rearward end region of the rearward-extending support rearwardly as viewed in a direction of travel upon release of the pyrotechnically releasable connecting element between the rearward-extending support and the supporting vehicle body part.

2. The motor vehicle according to claim 1, wherein
   the rearward end region of the rearward-extending support and the supporting vehicle body part mutually overlap in the direction of travel, and the rearward end region of the rearward-extending support rests on an underside of the supporting vehicle body part.

3. The motor vehicle according to claim 2, wherein the pyrotechnically releasable connecting element is one of a pyrotechnical separating screw, a pyrotechnically separating bolt or a pyrotechnical détente.

4. The motor vehicle according to claim 1, wherein the pyrotechnically releasable connecting element is one of a pyrotechnical separating screw, a pyrotechnically separating bolt or a pyrotechnical détente.

5. The motor vehicle according to claim 4, wherein the pyrotechnically releasable connecting element provides a form-locking connection between the rearward-extending support and the supporting vehicle body part in a non-triggered state.

6. The motor vehicle according to claim 1, wherein the pyrotechnically releasable connecting element provides a form-locking connection between the rearward-extending support and the supporting vehicle body part in a non-triggered state.

7. The motor vehicle according to claim 1, wherein in an event of a detected collision having a substantial frontal component, the pyrotechnically releasable connecting element is triggered to release the connection between the rearward-extending support and the supporting vehicle body part.

8. The motor vehicle according to claim 1, further comprising:
an electric line extending from an interior of the vehicle occupant compartment to the pyrotechnically releasable connecting element, wherein
the pyrotechnically releasable connecting element is electrically triggered via the electric line.

9. The motor vehicle according to claim 1, wherein the guide arranged between the rearward end region of the rearward-extending support and the supporting vehicle body part is an oblong hole in either the rearward-extending support or the supporting vehicle body part, the oblong hole extending in the direction of travel; and
a guide element is arranged to project through the oblong hole at a rearward end of the oblong hole, viewed in the direction of travel, said guide element being connected with either the supporting vehicle body part or the rearward-extending support.

10. The motor vehicle according to claim 9, wherein the guide element comprises a screw that screws into the supporting vehicle body part or the rearward-extending support, whereby the rearward-extending support is pressed onto the supporting vehicle body part.

11. The motor vehicle according to claim 10, wherein the rearward-extending support or the supporting vehicle body part having the oblong hole has a thickness that decreases in a region of the oblong hole in a longitudinal direction of the oblong hole toward the front, viewed in the direction of travel.

12. The motor vehicle according to claim 9, wherein the rearward-extending support or the supporting vehicle body part having the oblong hole has a thickness that decreases in a region of the oblong hole in a longitudinal direction of the oblong hole toward the front, viewed in the direction of travel.

13. The motor vehicle according to claim 1, further comprising:
engine side members;
struts extending above the axle support, said struts connecting a forward region of the axle support, viewed in the direction of travel, with the engine side members; and
wherein the engine side members extend from a front wall of the vehicle occupant compartment toward a front of the vehicle viewed in the direction of travel, and are configured to accommodate a forward bumper of the vehicle.

\* \* \* \* \*